US012517688B2

(12) United States Patent
Kawamae et al.

(10) Patent No.: US 12,517,688 B2
(45) Date of Patent: Jan. 6, 2026

(54) HEAD-MOUNTED DISPLAY AND IMAGE DISPLAY SYSTEM

(71) Applicant: Maxell, Ltd., Kyoto (JP)

(72) Inventors: Osamu Kawamae, Kyoto (JP); Shigeyuki Itou, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/912,919

(22) PCT Filed: Mar. 23, 2020

(86) PCT No.: PCT/JP2020/012761
§ 371 (c)(1),
(2) Date: Sep. 20, 2022

(87) PCT Pub. No.: WO2021/191977
PCT Pub. Date: Sep. 30, 2021

(65) Prior Publication Data
US 2023/0195396 A1 Jun. 22, 2023

(51) Int. Cl.
G06T 7/70 (2017.01)
G06F 3/14 (2006.01)
(Continued)

(52) U.S. Cl.
CPC .......... G06F 3/14 (2013.01); G06T 7/50 (2017.01); G06T 7/62 (2017.01); G06T 7/70 (2017.01);
(Continued)

(58) Field of Classification Search
CPC ............ G06F 3/14; G06F 3/012; G06T 7/50; G06T 7/62; G06T 7/70; G06T 11/00; H04N 17/002
See application file for complete search history.

(56) References Cited

U.S. PATENT DOCUMENTS

2007/0052703 A1* 3/2007 Seto .................. G06T 1/60
345/419
2011/0213664 A1 9/2011 Osterhout et al.
(Continued)

FOREIGN PATENT DOCUMENTS

JP 2013-521576 A 6/2013
JP 2016-504615 A 2/2016
(Continued)

OTHER PUBLICATIONS

International Search Report of PCT/JP2020/012761 dated May 26, 2020.

Primary Examiner — Sultana M Zalalee
(74) Attorney, Agent, or Firm — MATTINGLY & MALUR, PC

(57) ABSTRACT

An HMD includes: a camera configured to image an external landscape; a camera abnormality detector configured to detect operation abnormality of the camera; a sensor group configured to detect a position, a distance, and the like of an object within the external landscape; a sensor abnormality detector configured to detect operation abnormality of the sensor group; an image generator configured to generate an image; and a mode switcher configured to switch a processing mode of the image generator. The image generator has an AR advanced processing mode of generating a high-accuracy AR advanced image by using image data captured by the camera and detection data detected by the sensor group, and an AR simple processing mode of generating AR simple image simpler than the AR advanced image. When an operation of the camera or the sensor group is abnormal, the mode switcher switches into the AR simple processing mode.

13 Claims, 15 Drawing Sheets

(51) Int. Cl.
*G06T 7/50* (2017.01)
*G06T 7/62* (2017.01)
*G06T 11/00* (2006.01)
*H04N 17/00* (2006.01)
*G06F 3/01* (2006.01)

(52) U.S. Cl.
CPC ........... G06T 11/00 (2013.01); H04N 17/002 (2013.01); *G06F 3/012* (2013.01)

(56) References Cited

U.S. PATENT DOCUMENTS

| | | |
|---|---|---|
| 2014/0132484 A1 | 5/2014 | Pandey et al. |
| 2016/0109931 A1* | 4/2016 | Kobayashi ........... G02B 27/017 345/212 |
| 2016/0110921 A1* | 4/2016 | Takahashi .......... G02B 27/0172 345/633 |
| 2017/0162177 A1* | 6/2017 | Lebeck ................ G06F 21/6218 |
| 2017/0243385 A1* | 8/2017 | Mitsugi .................... G09F 9/372 |
| 2018/0050704 A1* | 2/2018 | Tascione ............. B60W 10/184 |
| 2018/0108145 A1 | 4/2018 | Miura et al. |
| 2018/0136465 A1* | 5/2018 | Chi ........................ G06F 3/0416 |
| 2018/0365477 A1* | 12/2018 | Seol ........................ G06F 21/84 |
| 2019/0370544 A1* | 12/2019 | Wright, Jr. ............. G06Q 10/20 |
| 2021/0295602 A1* | 9/2021 | Scapel ................ G06F 3/04815 |
| 2021/0375049 A1* | 12/2021 | Syed .................... G06T 19/006 |

FOREIGN PATENT DOCUMENTS

| | | |
|---|---|---|
| JP | 2018-67300 A | 4/2018 |
| JP | 2019-012537 A | 1/2019 |
| JP | 2019-038374 A | 3/2019 |

\* cited by examiner

F I G. 1
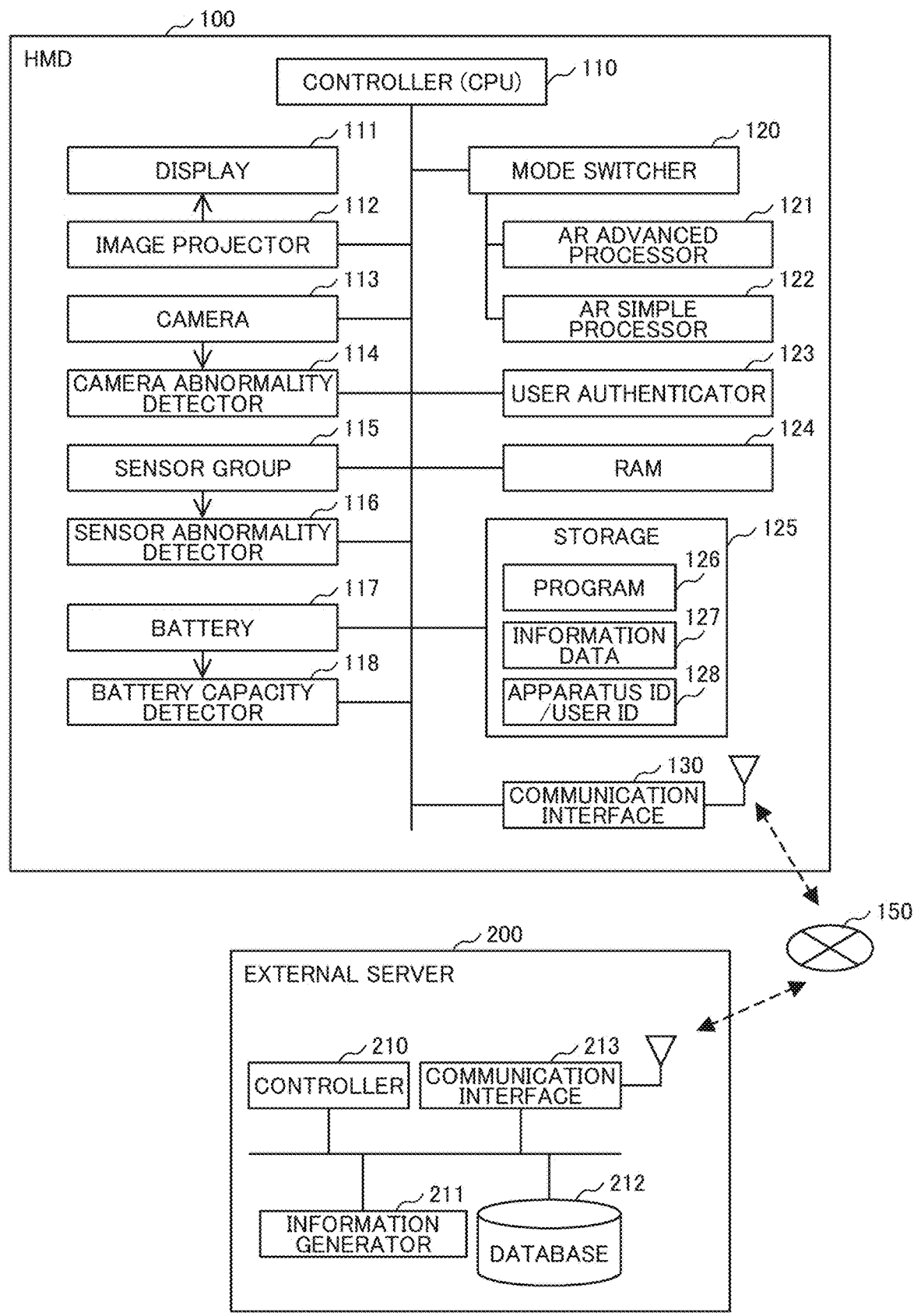

AR ADVANCED IMAGE 20

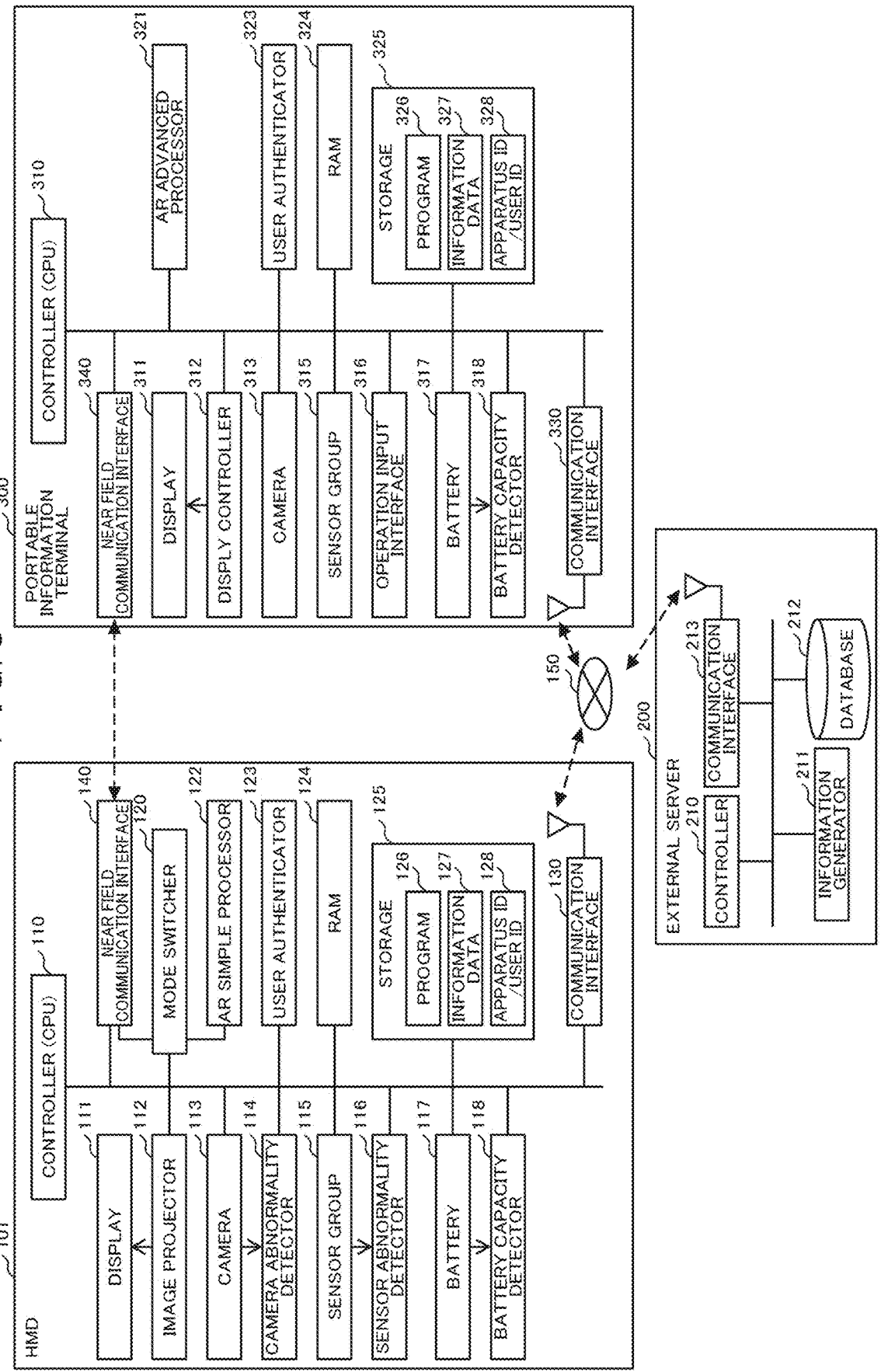

F I G. 9

TRANSMISSION AND RECEPTION DATA BETWEEN HMD AND PORTABLE INFORMATION TERMINAL

| HMD(101) → PORTABLE INFORMATION TERMINAL (300) | PORTABLE INFORMATION TERMINAL (300) → HMD(101) |
|---|---|
| APPARATUS ID OF HMD/USER ID (128) | TERMINAL ID (328) OF PORTABLE INFORMATION TERMINAL |
| CAPTURED IMAGE DATA OF CAMERA (113) | IMAGE DATA OF AR ADVANCED PROCESSOR (321) |
| DETECTION DATA (POSITION, DISTANCE, ACCELERATION, AND THE LIKE) OF SENSOR GROUP (115) | CONNECTION SITUATION WITH HMD CONNECTION SITUATION WITH NETWORK |
| RESIDUAL CAPACITY OF BATTERY (117) | RESIDUAL CAPACITY OF BATTERY (317) |
| OPERATION MODE OF HMD | RESULT OF USER AUTHENTICATOR (323) NOTIFICATION FROM APPLICATION |

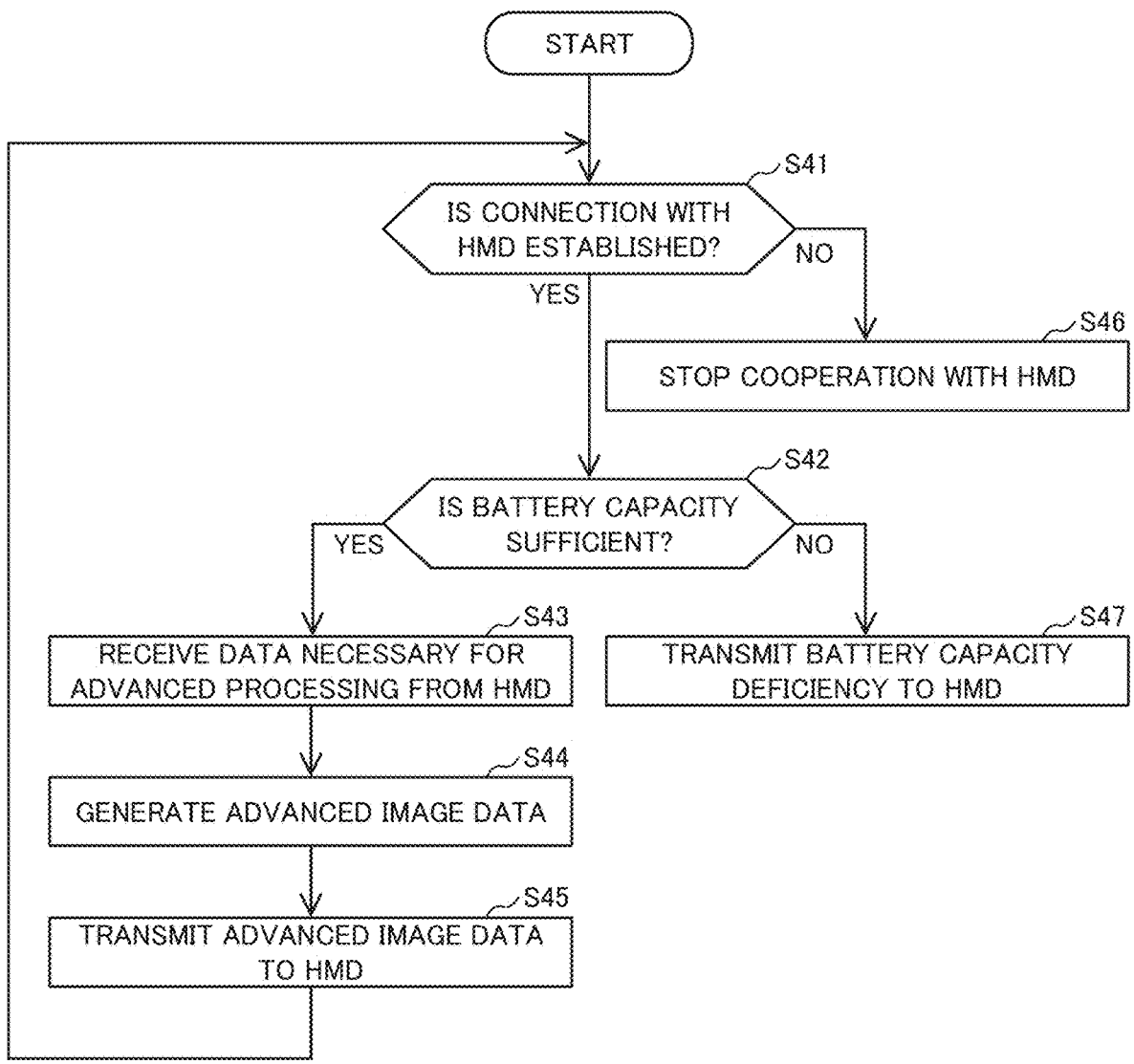

F I G. 1 2 B
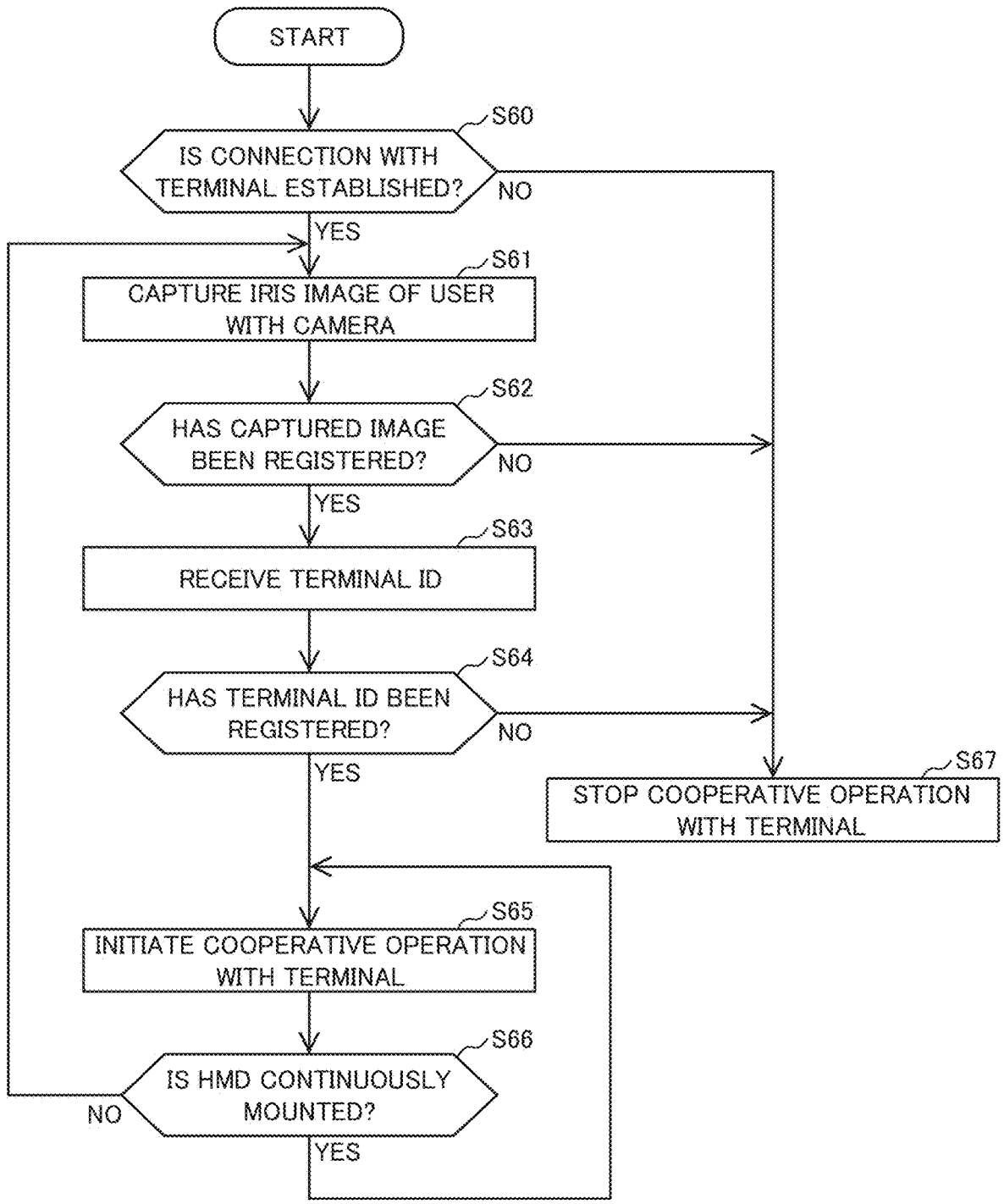

HEAD-MOUNTED DISPLAY AND IMAGE DISPLAY SYSTEM

TECHNICAL FIELD

The present invention relates to a head-mounted display that is mounted on a user's head and displays an image of an augmented reality space and an image display system.

BACKGROUND ART

According to a head mounted display (HMD) that is used in a state of being mounted on the user's head, an object in a reality space in front of eyes can be visually recognized through a display while displaying an augmented reality (hereinafter, referred to as "AR image"). A camera that images an object on a forward side, and a sensor group of a plurality of sensors such as a sensor that measures a distance up to the object and a sensor that measures a position of the HMD are mounted on the HMD, and data acquired by the camera or the sensor group is used to create the AR image.

As a power saving measure of the HMD, for example, Patent Document 1 discloses that a measurement frequency of the camera is lowered when a specific object does not exist to save power consumption.

CITATION LIST

Patent Document

Patent Document 1: JP 2018-67300 A

SUMMARY OF THE INVENTION

Problems to be Solved by the Invention

In AR image display by the HMD, an image of a virtual object that does not exist in reality is displayed in accordance with a position of a real object. For example, display is performed in a superimposed manner as if a virtual vase is placed on a table on a forward side. In this case, the virtual vase is the AR image, and in order to display the virtual vase on the table on the forward side in a superimposed manner, it is necessary to recognize the table from a forward image by the camera and the sensor group mounted on the HMD, to detect a size, a shape, a position, and the like of the table with accuracy, and to mathematically operate a shape and a position of the vase to be displayed by using detection data.

To perform the mathematical operation, it is premised that the camera and the sensor group normally operates, and correct detection data can be acquired. When any one of the camera and the sensor group is in an abnormal state, creation of a normal AR image becomes difficult, and there is no choice but to stop the image display.

However, in a case where the HMD is used for maintenance and inspection work of facilities, or the like, and a work procedure, an adjustment value, or the like is displayed by the AR image, when display of the AR image is suddenly stopped due to abnormality in the camera or the like, the maintenance and inspection work is greatly interfered, and thus a measure to avoid the problem is required.

In the related art including Patent Document 1, various suggestions have been made as the power saving measure of the HMD, but there is no consideration for continuing the AR image display that is an original function of the HMD.

In consideration of the problem, an object of the invention is to provide an HMD capable of continuing AR image display that is an original function even when abnormality occurs in a camera, a sensor, or the like that is mounted on the HMD.

Solutions to Problems

To accomplish the object, the present invention employs the following method. A head-mounted display that a user wears on the head to display an image includes: a camera configured to image an external landscape; a camera abnormality detector configured to detect operation abnormality of the camera; a sensor group configured to detect a position, a distance, and a size of an object within the external landscape; a sensor abnormality detector configured to detect operation abnormality of the sensor group; a battery configured to supply power; an image generator configured to generate an image; a display configured to display a generated image; and a mode switcher configured to switch a processing mode of the image generator.

The image generator has an AR advanced processing mode of generating a high-accuracy augmented reality image (hereinafter, referred to as "AR advanced image") by using image data captured by the camera and detection data detected by the sensor group, and an AR simple processing mode of generating image information (hereinafter, referred to as "AR simple image") simpler than the AR advanced image. The mode switcher switches the AR advanced processing mode and the AR simple processing mode from each other in correspondence with a detection result of the camera abnormality detector or the sensor abnormality detector.

For example, in a case where it is determined that an operation of the camera or the sensor group is abnormal on the basis of a detection result of the camera abnormality detector or the sensor abnormality detector, the mode switcher switches a mode into the AR simple processing mode.

Effects of the Invention

According to the invention, even in a case where abnormality occurs in a camera, a sensor, and the like which are mounted in the HMD, it is possible to allow AR image display that is an original function to continue and it is possible to minimize interference for a user.

BRIEF DESCRIPTION OF THE DRAWINGS

FIG. 1 is a view illustrating a configuration of an HMD according to Example 1.

FIG. 8 is a view illustrating a configuration of an image display system according to Example 2.

FIG. 9 is a view illustrating an example of data that is transmitted and received between the HMD and a portable information terminal.

FIG. 11B is a flowchart illustrating a mode switching operation (portable information terminal side).

FIG. 12B is a flowchart illustrating a user authentication operation (HMD side).

MODE FOR CARRYING OUT THE INVENTION

Figure 2:
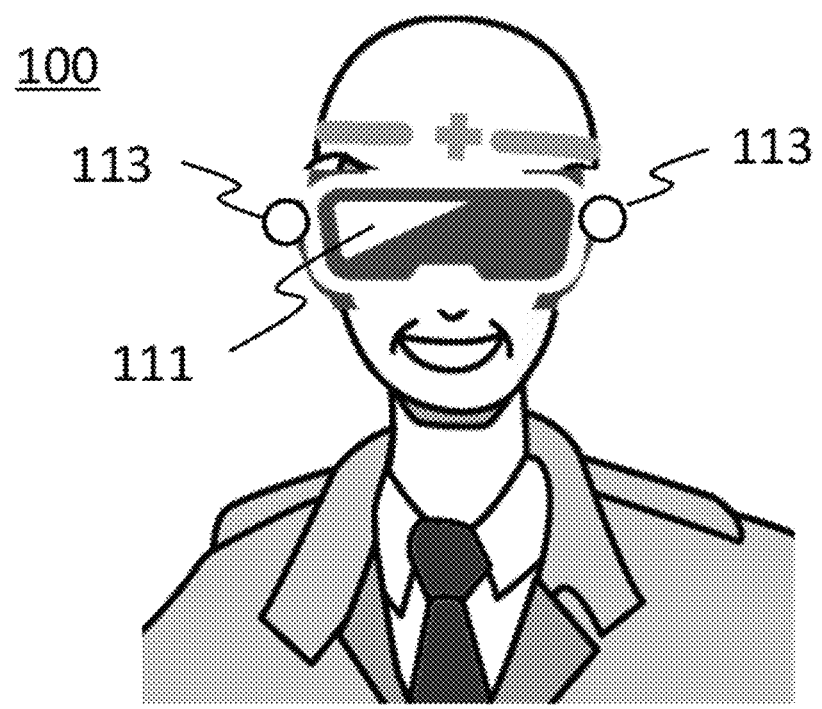
FIG. 2 is an external view illustrating a state in which a user wears the HMD.

Hereinafter, an embodiment of a head-mounted display (HMD) of the invention will be described with reference to the accompanying drawings. An AR image that is used in the following description is an augmented reality image.

Example 1

In Example 1, an HMD 100 is connected to an external server 200 and performs display of the AR image. Specifically, description will be given with reference to an application to a maintenance and inspection work of a plant system as an example. An inspector (user) actually confirms various inspection sites of the plant system, and performs a maintenance work (for example, valve opening/closing adjustment or the like) in correspondence with the inspection result. When the user inspects an arbitrary facility, the AR image for assisting the inspection work is displayed on the HMD 100 mounted the user. With regard to the displayed AR image, not only a case where the AR image is generated inside the HMD 100 but also a case where information is received from an external server 200 of a management company of a plant system and is displayed is assumed. When a specific procedure, an adjustment numerical value, or the like to be inspected is displayed on the HMD 100 in a superimposed manner, the user can perform an accurate and efficient maintenance and inspection work.

FIG. 1 is a view illustrating a configuration of the HMD 1 according to Example 1, and the HMD 100 is connected to the external server 200.

The configuration of the HMD 100 includes a controller 110 that is constituted by a CPU or the like and controls an operation of the HMD 100, a display 111 that displays AR image data or the like, an image projector 112 that projects an image to the display 111, a camera 113 that images an external landscape on a forward side, a camera abnormality detector 114 that detects operation abnormality of the camera 113, a sensor group 115 of various sensors such as a distance sensor, a position (GPS) sensor, an acceleration sensor, and a gyro sensor which detect a position, a distance, and a size of an object imaged by the camera 113, and a position, a movement, and an angular velocity of the HMD 100, a sensor abnormality detector 116 that detects operation abnormality of the sensor group 115, a battery 117 that supplies power to operate the HMD 100, and a battery capacity detector 118 that detects a residual capacity of the battery 117.

In addition, the HMD 100 includes an AR advanced processor 121 that generates high-definition AR image data with high accuracy, and an AR simple processor 122 that generates simple AR image data such as a text character, a simple sign, and a simple record to be displayed on the display 111 as an image generator that generates an image to be displayed on the display 111. Furthermore, the HMD 100 includes a mode switcher 120 that switches operations of the AR advanced processor 121 and the AR simple processor 122. Hereinafter, an operation mode performed by the AR advanced processor 121 is referred to as "AR advanced processing mode", image data generated by the mode is referred to as "AR advanced image data", an operation mode performed by the AR simple processor 122 is referred to as "AR simple processing mode", and image data generated in the mode is referred to as "AR simple image data".

Furthermore, the HMD 100 includes a user authenticator 123 that specifies a user of the HMD 100, a RAM 124 that becomes a work area when the controller 110 executes a program, a storage 125 that is constituted by a flash memory or the like, and a communication interface 130 that performs data transmission and reception with the external server 200 through a network 150.

The storage 125 stores a program 126 for executing a basic operation of the HMD 100 and various functions to be described later, information data 127 such as image data handled by the HMD 100, and a detection signal, an apparatus ID for specifying the HMD 100, a user ID 128 for specifying an authorized user, and the like.

On the other hand, the external server 200 includes a controller 210 that controls an operation of the external server 200, an information generator 211 that generates AR image data in correspondence with a request from the HMD 100, a database 212 that stores information for maintenance and inspection, and a communication interface 213 that performs data transmission and reception with the HMD 100.

FIG. 2 is an external view illustrating a state in which a user wears the HMD 100. The HMD 100 is mounted on the user's head, and is in a state in which an external landscape in front of eyes is viewed through the transmission type display 111. Therefore, when an AR image is projection-displayed on the display 111 by the image projector 112, the user can visually recognize a state in which the AR image is superimposed on the external landscape in front of eyes. In addition, the external landscape in front of eyes is imaged by the camera 113 that is provided on a left side and a right side of the HMD 100, and the captured image is used in generation of the AR image, determination of a display position, and the like.

Here, description will be given of a process of generating the AR image. A position, a size, a shape, and the like of an object in an image in front of eyes are calculated by a complicated operation process by using captured image data in front of eyes which is obtained by the camera 113, and various pieces of data acquired by the sensor group 115. Predetermined AR image data is generated on the basis of calculated arrangement (three-dimensional coordinates) of the object, and the AR image data is positioned and displayed in a superimposed manner. That is, to display the AR image, it is premised that data is accurately obtained by the camera 113 and the sensor group 115.

In addition to this, the head of the user who wears the HMD 100 can change a direction, and a camera image captured by the camera 113 is a moving image that varies from moment to moment, and thus the AR image data should be generated to correspond to the moving image. For this, it is necessary to detect how the head of the user who wears the HMD 100 moves at any time by the sensor group 115, to grasp a positional relationship between the HMD 100 and the object at that time, and to generate the AR image data in correspondence with the positional relationship. That is, a complicated and high-speed operation process is necessary in AR image processing.

Next, description will be given of a mode switching operation of AR image display in this example. As described above, in the advanced processing mode of generating high-accuracy AR image data (AR advanced image data), information acquired by the camera 113 and the sensor group 115 is used. Accordingly, when abnormality occurs in the operation of the camera 113 or the sensor group 115, it is difficult to accurately calculate a position and a distance of an object in front of eyes, and a movement (acceleration, rotation, or the like) of the user's head, and thus it is difficult to generate normal AR advanced image data. In this case, switching is made to a simple processing mode of generating simple AR image data (AR simple image data) such as text data. In the simple processing mode, the position and the distance of the object cannot be obtained, and thus the generated AR simple image is displayed at a predetermined position within a display.

Furthermore, even in a case where the operation of the camera 113 and the sensor group 115 is normal, since the complicated and high-speed operation process is necessary to generate the AR advanced image data, and power consumed by the controller (CPU) 110 and the AR advanced processor 121 is large, it is required to include a high-capacity battery 117. However, from the viewpoint that the HMD 100 is mounted on the user's head, there is a demand for the battery 117 to be as small and light as possible. In this case, a situation in which the power of the battery 117 becomes deficient during the operation of the HMD 100 due to generation of the AR advanced image data. In this case, from the viewpoint of a user merit, it is better to switch a mode into the AR simple processing mode in which power consumption is less and to generate the AR simple image data without interruption in comparison to a case where the AR advanced processing mode continues and image display is interrupted in the middle of the mode. On the basis of the above-described policy, the mode switching operation in the AR image display is performed as follows.

Figure 3:
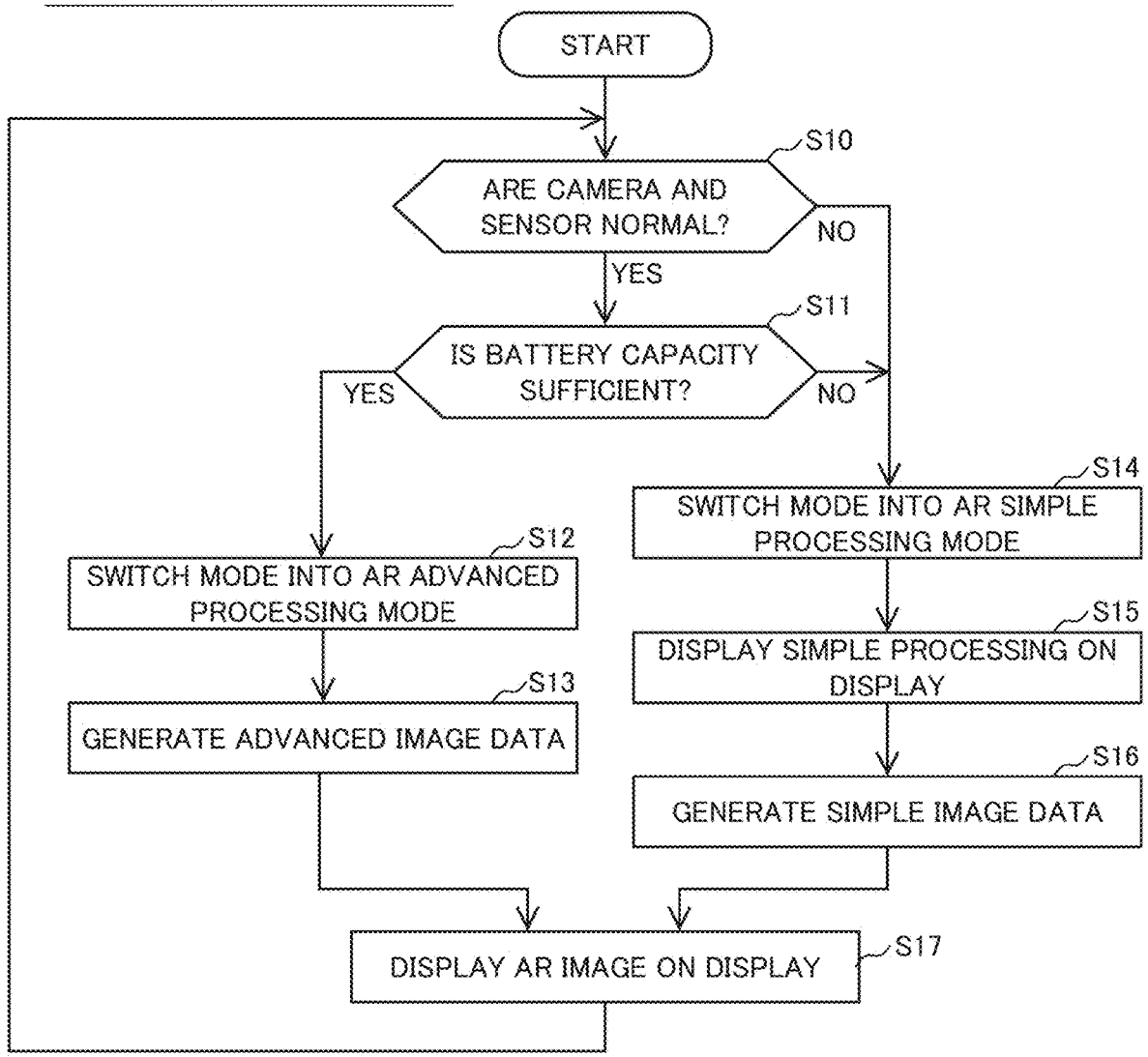
FIG. 3 is a flowchart illustrating a mode switching operation.

FIG. 3 is a flowchart illustrating the mode switching operation. Hereinafter, description will be given in the order of steps.

S10: The camera abnormality detector 114 and the sensor abnormality detector 116 determine whether or not the operation of the camera 113 and the sensor group 115 is abnormal. The operation abnormality of the camera 113 and the sensor group 115 is determined by detection values (output values) showing abnormal values, no output values (zero), or the like, but a self-checking function for every sensor also can be used. In a case of normality (Yes), the process proceeds to S11, and in a case of abnormality (No), the process proceeds to S14.

S11: The residual capacity of the battery 117 is determined by the battery capacity detector 118. When the residual capacity is sufficient (Yes), the process proceeds to S12, and when the residual capacity is deficient (No), the process proceeds to S14.

S12: The mode switcher 120 switches a mode into an advanced processing mode by the AR advanced processor 121. In this case, captured image data from the camera 113 and various pieces of sensor data from the sensor group 115, which are necessary to generate the AR advanced image data, are input to the AR advanced processor 121.

S13: The AR advanced processor 121 calculates a position and a distance of an object from the captured image data, and calculates movement of the HMD 100 from the sensor data. On the basis of the calculation results, the AR advanced image data is generated on the basis of the program 126 (application) and information data 127 stored in the storage 125. In the advanced processing mode, positioning is performed so that the AR image is superimposed on a predetermined object imaged by the camera instead of a user's visual point. In addition, in the advanced processing mode, with respect to a moving image captured by the camera 113, AR advanced image data is generated moment to moment to correspond to the moving image.

S14: On the other hand, in a case where abnormality is detected in S10, or in a case where the battery residual capacity is deficient in S11, the mode switcher 120 switches a mode into the simple processing mode by the AR simple processor 122. In this case, the captured image data from the camera 113 and the various pieces of sensor data from the sensor group 115 are not used.

S15: A gist indicating "AR simple processing" is displayed on the display 111, and a user is notified of the gist. According to this, the user understands that display is changed from the AR advanced image to the AR simple image.

S16: In the AR simple processor 122, AR simple image data such as text data is generated on the basis of the program 126 (application) and information data 127 stored in the storage 125. In the AR simple processing, since information such as the position and the distance of the object is not used, the generated AR simple image is merely displayed at a predetermined position within the display 111.

S17: The AR advanced image data generated by the AR advanced processor 121 in S13 or the AR simple image data generated by the AR simple processor 122 in S16 is projection-displayed on the display 111 by the image projector 112. Then, the process returns to S10, and the above-described processes is repeated, and the mode switching and the AR image display are performed.

Here, the order of the processing in S10 (abnormality determination on the camera and the sensor group), and the processing in S11 (determination on the residual capacity of the battery) may be exchanged. In addition, the processing in S10 (abnormality determination on the camera and the sensor group) may be performed only at the initiation of the operation, and may be omitted thereafter.

Note that, processing of the AR advanced processor 121, the AR simple processor 122, and the mode switcher 120 may be performed inside the controller (CPU) 110, or the mode switcher 120 may be performed by the image projector 112.

In the HMD 100 of this example, information stored in the external server 200 that is managed by a management company may also be used to generate the AR image data. Alternatively, AR image data generated by the external server 200 can be acquired and displayed by the HMD 100. The reason for this is because, for example, a reference value for maintenance and inspection or the like is stored in the database 212 of the external server 200. Accordingly, when generating the AR image data by using the information transmitted from the database 212, it is possible to provide a high-accuracy AR image with a large amount of information to the user.

However, the maintenance and inspection work based on the standard of the management company should be limited to a specific inspector (user) who is authorized in advance. Accordingly, the HMD 100 of this example is provided with the user authenticator 123 that specifies a user. Hereinafter, a user is specified on the basis of a user identification function, and only an authorized user can generate AR image data by using the external server 200.

Figure 4:
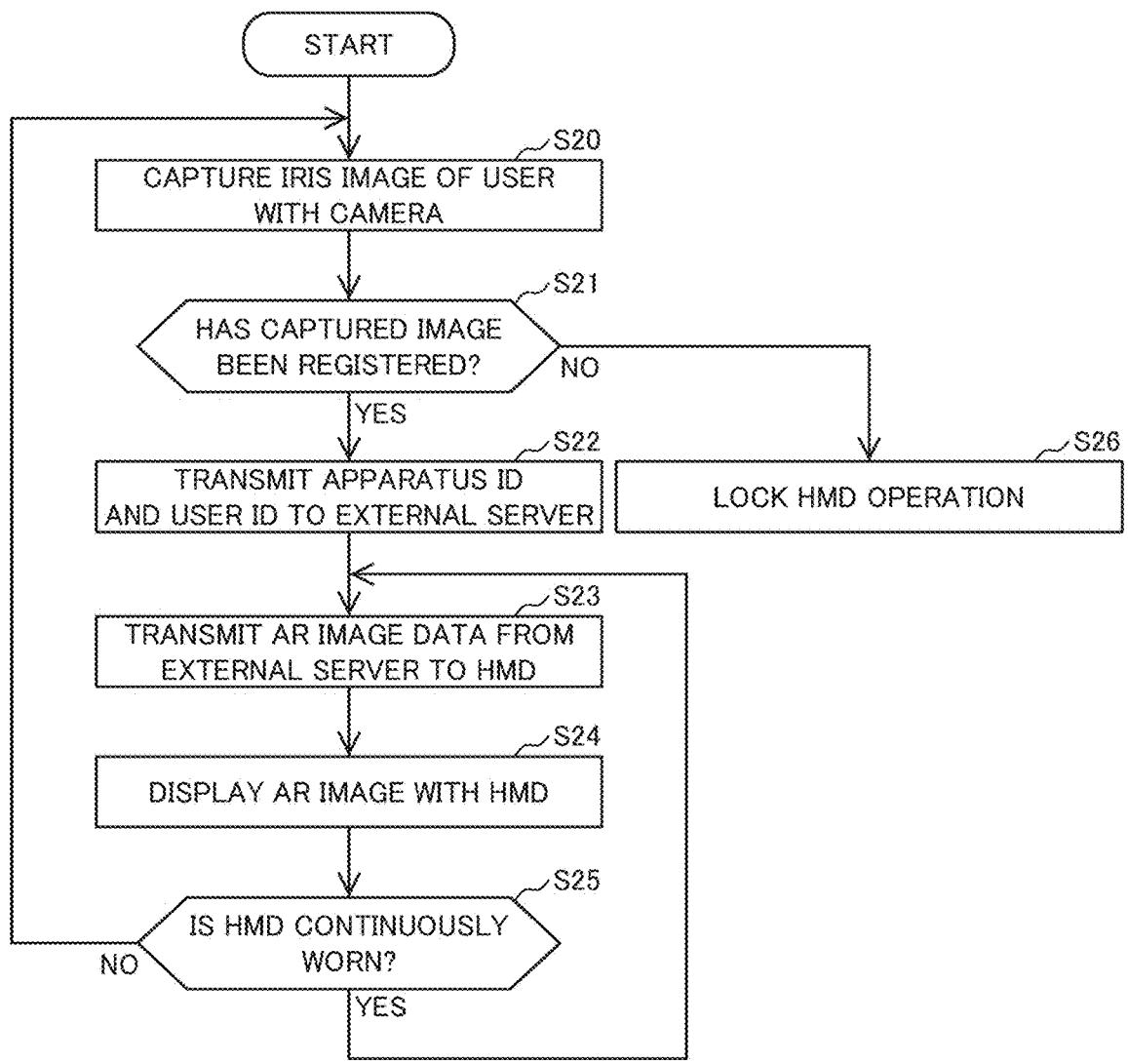
FIG. 4 is a flowchart illustrating a user authentication operation.

FIG. 4 is a flowchart illustrating a user authentication operation. Hereinafter, with regard to an authentication method performed by the user authenticator 123, description will be given of a case of using a user's iris image. An iris image of a user who is authorized to use the HMD 100 is registered in the user ID 128 of the storage 125. The user authentication method is not limited thereto, and a method of using a face image or a fingerprint, a method of using a vein pattern, or the like can also be used.

S20: An iris image is captured from a face image of a user with the camera 113 mounted in the HMD 100.

S21: The user authenticator 123 determines whether or not the captured iris image has been registered in the user ID 128 of the storage 125. When the iris image has been registered (Yes), the process proceeds to S22, and when the iris image has not been registered (No), the process proceeds to S26.

S26: Since the captured iris image is not registered, a user is determined as a non-authorized user, and the HMD 100 is locked by the controller 110, and it enters an operation-impossible state.

S22: When the captured iris image has been registered, the user is determined as an authorized user, and the apparatus ID 128 of the HMD 100 and ID data of a user specified in S21 are transmitted to the external server 200 that manages the HMD 100 through the communication interface 130.

S23: In the external server 200, the apparatus ID and the user ID which are received from the HMD 100 are compared with an apparatus ID and a user ID which are registered in the database 212. In a case where comparison is successful, information (for example, a reference value for maintenance and inspection, or the like) stored in the database 212, or the AR image data generated by the information generator 211 is transmitted to the HMD 100.

S24: The HMD 100 generates AR image data on the basis of the information received from the external server 200, and displays the AR image data on the display 111. Since the AR image data is generated in accordance with the information acquired from the external server 200, it is possible to display an AR image with a large amount of information.

S25: It is determined whether or not the HMD 100 is worn by the user at regular intervals or at all times. The reason for this is to confirm that the HMD 100 is continuously used by an authorized user. In a case where the HMD 100 is worn continuously (Yes), the process returns to S23, and continues communication with the external server 200. In a case where the HMD 100 is not worn continuously (No), there is a possibility that a user may be changed, and thus the process returns to S20 and performs user authentication again.

Next, description will be given of a specific example of AR images (an advanced image and a simple image) displayed on the display 111. Here, description will be given of a case where the HMD 100 is used for a maintenance and inspection work of a plant system.

Figure 5:
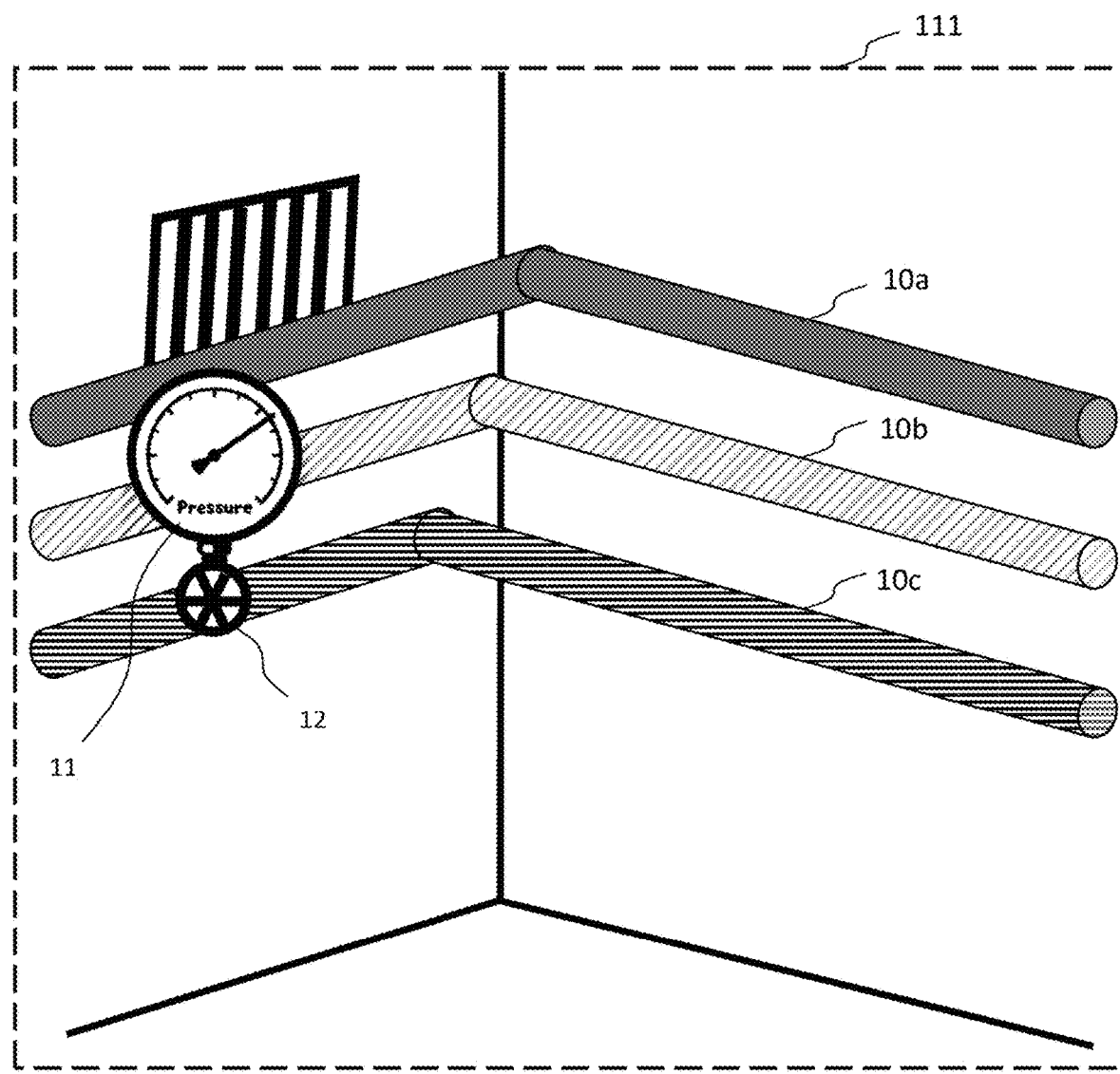
FIG. 5 is a view illustrating an image of a plant system as an example of a checking object.

FIG. 5 illustrates an image of a plant system as an example of an object to be inspected. That is, the image is an image of an object to be inspected which is visually recognized by a user through the display 111, or an object to be inspected which is imaged by the camera 113, and FIG. 5 is a state before displaying the AR image. In the plant system, a plurality of pipes 10a, 10b, and 10c, and a meter 11 and a valve 12 provided in the pipe 10c exist. A pressure value of the pipe 10c is displayed in the meter 11. Note that, distances from the pipes 10a, 10b, and 10c from an inspector (user) are different from each other.

Figure 6A:
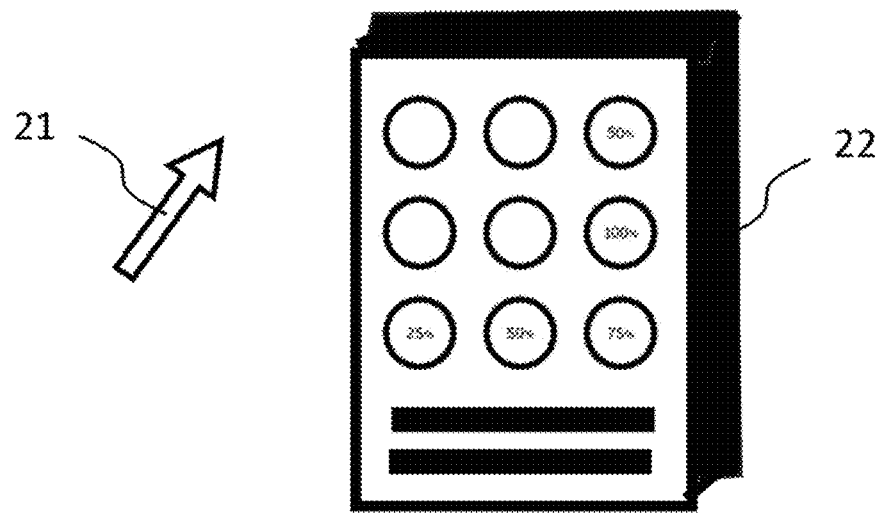
FIG. 6A is a view illustrating an example of an AR advanced image.

FIG. 6A is an example of an AR advanced image 20 that is generated by the AR advanced processor 121. The AR advanced image 20 includes an arrow 21 that is displayed in a manner of being superimposed on the meter 11 of the plant, and an image of an adjustment panel 22. The images are generated by the AR advanced processor 121 on the basis of a maintenance and inspection application stored in the storage 125 of the HMD 100.

Figure 6B:
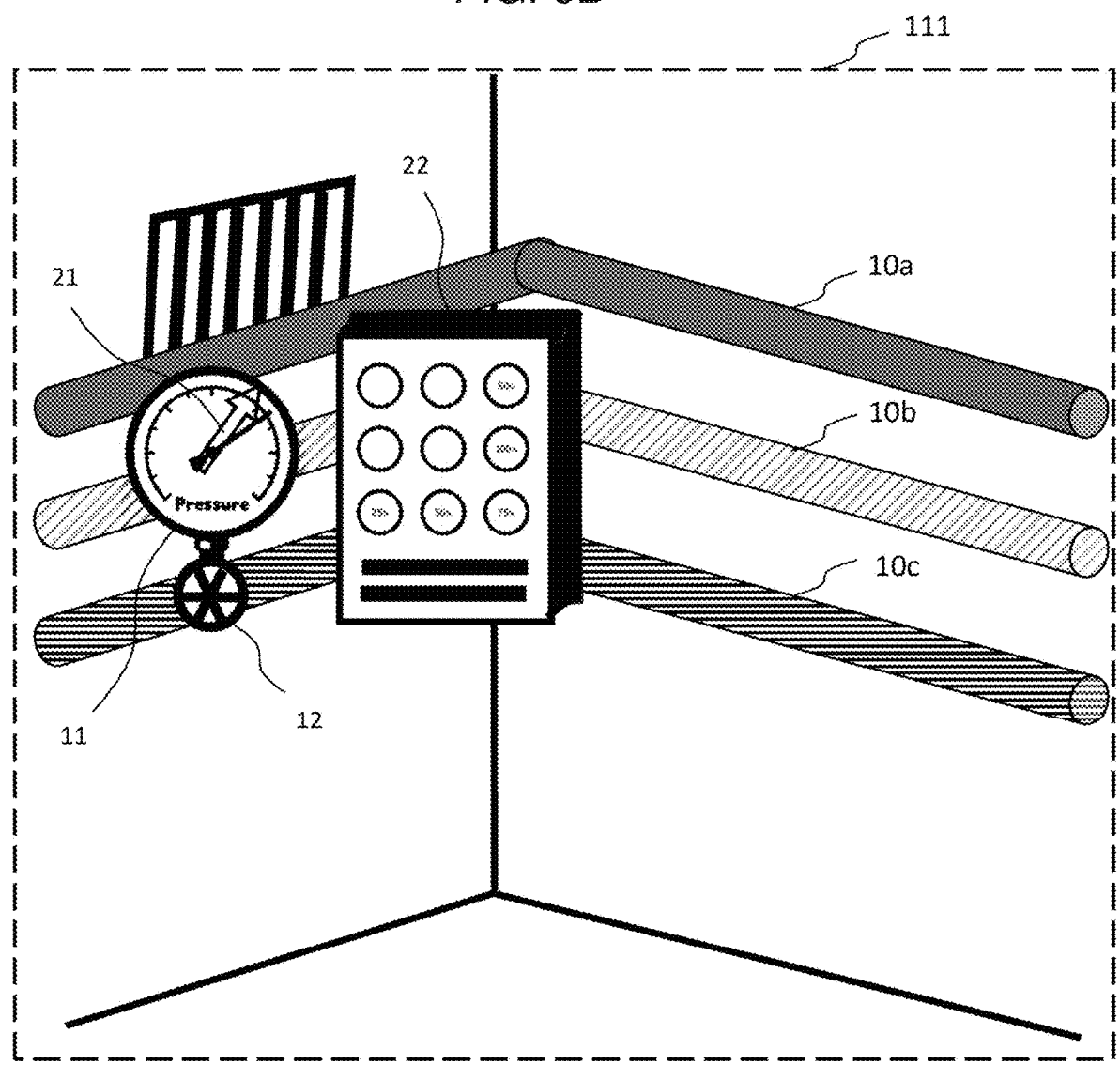
FIG. 6B is a view illustrating a state in which the AR advanced image is displayed in a manner of being superimposed on a checking object.

FIG. 6B is a view illustrating a state in which the AR advanced image 20 in FIG. 6A is displayed in a manner of being superimposed on the object to be inspected in FIG. 5. In the meter 11 provided in the pipe 10c that is an object to be inspected, an adjustment value to be maintained which is the AR advanced image is displayed with a thick arrow 21, and the adjustment panel 22 is displayed beside the meter 11.

Note that, the HMD 100 is mounted on an inspector's head, and the HMD 100 is constantly shaking in accordance with shaking of the inspector's head, and as a result, a position of the meter 11 that is an object to be inspected within the display 111 also irregularly fluctuates. Generation of the AR advanced images 21 and 22 corresponds to the movement, and positioning is performed at high speed to match the position of the meter 11 while constantly grasping the fluctuating position of the meter 11. In addition, a distance in a depth direction of the AR advanced images 21 and 22 which are displayed is positioned in accordance with a distance up to the meter 11 to be superimposed, but when being hidden behind the object, the AR images are processed (referred to as "occlusion") in order for contradiction not to occur in a front and rear relationship with another object within a field of view.

Figure 7A:
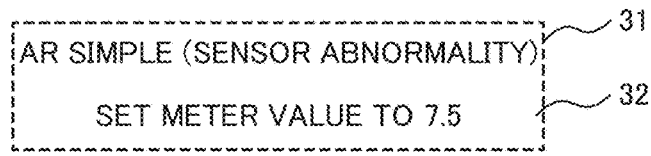
FIG. 7A is a view illustrating an example of an AR simple image.

FIG. 7A is an example of an AR simple image 30 that is generated by the AR simple processor 122. The AR simple image 30 includes notification information 31 for a user such as the AR simple processing mode and an abnormality detection situation, and a text image 32 indicating the contents of maintenance and inspection. In this example, a reference value of the meter 11 is shown in the text image 32.

Figure 7B:
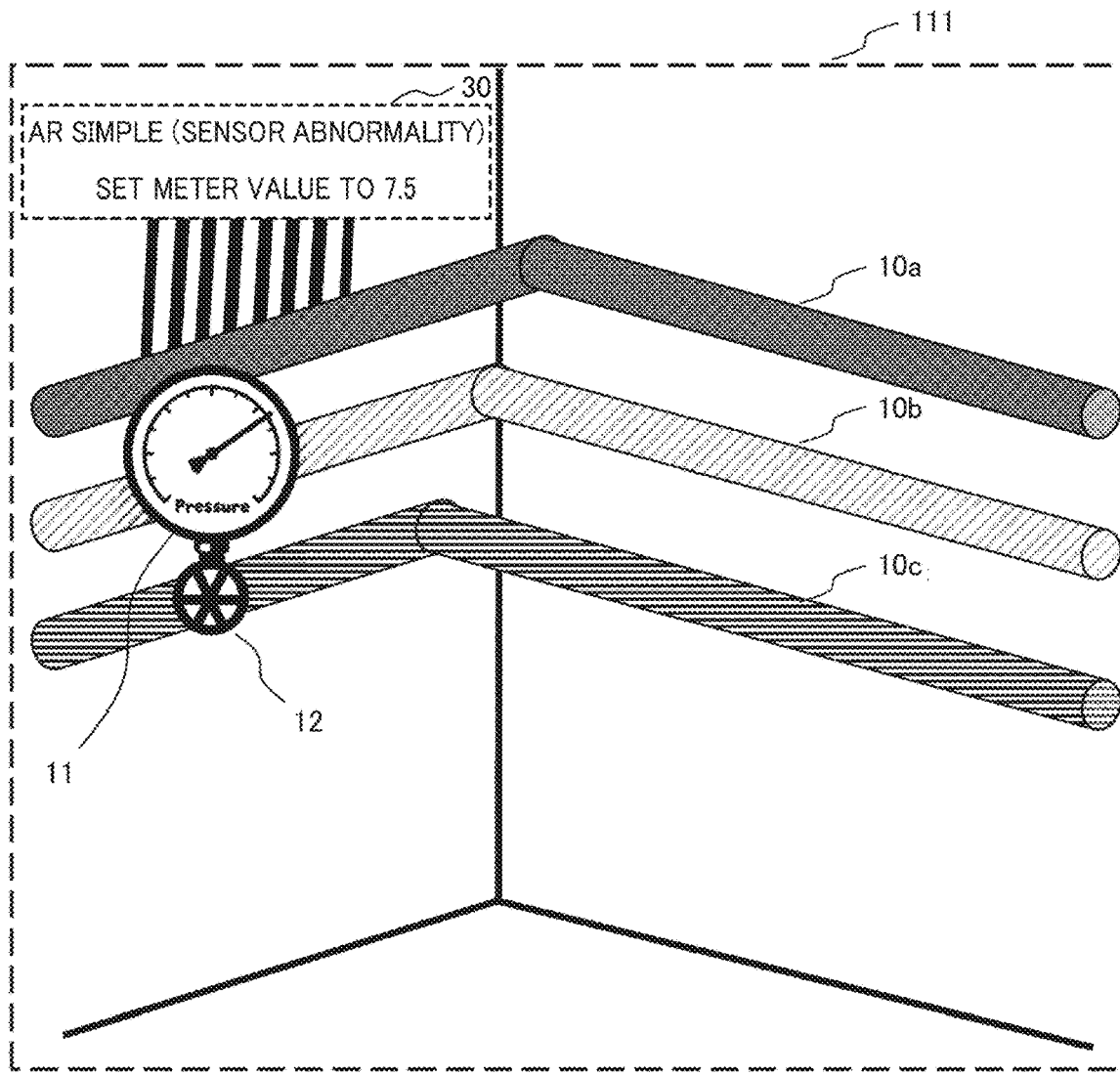
FIG. 7B is a view illustrating a state in which the AR simple image is displayed in a manner of being superimposed on the checking object.

FIG. 7B is a view illustrating a state in which the AR simple image 30 in FIG. 7A is displayed in a manner of being superimposed on the object to be inspected in FIG. 5. In this example, the generated AR simple image 30 is displayed on an upper and left side of the display 111. An inspector confirms the text image 32 (meter setting value) in the AR simple image 30 to be useful for the maintenance and inspection work.

As described above, according to Example 1, even when abnormality occurs in the camera 113 and the sensor group 115 mounted in the HMD 100, it is possible to allow AR image display that is an original function to continue and it is possible to minimize interference for the maintenance and inspection work. That is, when comparing the AR advanced image and the AR simple image with each other, from the viewpoint of supporting the maintenance and inspection work, accuracy and efficiency of the AR simple image are inferior, but a user merit is greater in comparison to a situation in which the display operation of the HMD 100 is stopped.

Example 2

In Example 2, description will be given of an image display system in which an HMD 101 and a portable information terminal 300 are connected, and which generates an AR image in cooperation of the HMD 101 and the portable information terminal 300. That is, in Example 2, the HMD 101 generates AR simple image data, but the HMD 101 displays AR advanced image data by receiving data generated in the portable information terminal 300. According to this, a configuration of the HMD 101 is simplified, and an apparatus that is inexpensive and light can be provided. Here, description will be given on the assumption of a smartphone as the portable information terminal 300, but an apparatus having a function to be described below is also applicable. In addition, an apparatus that is connected to a server that performs AR advanced image processing through a network is also possible.

FIG. 8 is a view illustrating a configuration of the image display system according to Example 2. Note that, the HMD 101 and the portable information terminal 300 are also connected to the external server 200 that has been described in Example 1 (FIG. 1). Note that, in FIG. 8, the same reference numeral will be given to a member that operates in the same manner as in FIG. 1, and redundant description will be omitted.

With regard to the configuration of the HMD 101, a near field communication interface 140 that transmits and receives data to and from the portable information terminal 300 is provided. Bluetooth (registered trademark) or a wireless LAN can be used in the near field communication interface 140, but wire connection may be employed. Examples of the data that is transmitted and received through the near field communication interface 140 includes image data captured by a camera 113 of the HMD 101, detection data acquired by a sensor group 115, AR advanced image data created by the portable information terminal 300, and the like. Note that, the AR advanced processor 121 in Example 1 (FIG. 1) is omitted because the function is executed on the portable information terminal 300 side. A controller (CPU) 110 controls transmission and reception of data to and from the portable information terminal 300 through the near field communication interface 140.

Next, a configuration of the portable information terminal 300 will be described. The portable information terminal 300 includes a controller (CPU) 310 that controls an operation of the portable information terminal 300, a near field communication interface 340 that transmits and receives data to and from the HMD 101, a display 311 that displays an image, a display controller 312 that controls the display 311, a camera 313, a sensor group 315 that detects a state (a position, acceleration, rotation, and the like) of the portable information terminal 300, an operation input interface 316 such as a touch pad that accepts an input of a user, a battery 317 that supplies power to the portable information terminal 300, a battery capacity detector 318 that detects a residual capacity of the battery 317, and a communication interface 330 for communication with an external apparatus through the network 150.

Furthermore, the portable information terminal 300 includes an AR advanced processor 321 that generates AR advanced image data, a user authenticator 323 that specifies a user of the portable information terminal 300, a RAM 324 that becomes a work area of the controller (CPU) 310, and a storage 325 that is constituted by a flash memory or the like. The storage 325 stores a program 326 for executing a basic operation or various functions (applications) of the portable information terminal 300, image data that is handled by the portable information terminal 300, information data 327 such as a detection signal, a terminal ID for specifying the portable information terminal 300, a user ID 328 for specifying an authorized user, and the like.

FIG. 9 is a view illustrating an example of data that is transmitted and received between the HMD 101 and the portable information terminal 300 through the near field communication interfaces 140 and 340.

Examples of data that is transmitted from the HMD 101 to the portable information terminal 300 include an apparatus ID for specifying the HMD 101 and a user ID 128 for specifying a user, image data captured by the camera 113, detection data (a position, a distance, acceleration, a battery residual capacity, and the like) of the sensor group 115 and the battery capacity detector 118, and an operation mode of the HMD 101 (temporal stoppage of the HMD 101, power ON, and the like).

Examples of data that is transmitted from the portable information terminal 300 to the HMD 101 include a terminal ID for specifying the portable information terminal 300 and information relating to processing capacity of the CPU 328, AR advanced image data generated by the AR advanced processor 321, connection information of the portable information terminal 300 (a connection situation with the HMD 101 and a connection situation with the network 150), a battery residual capacity obtained by the battery capacity detector 318, an authentication result obtained by the user authenticator 323, and a notification (mail reception, call reception, and the like) from an application of the portable information terminal 300.

Figure 10:
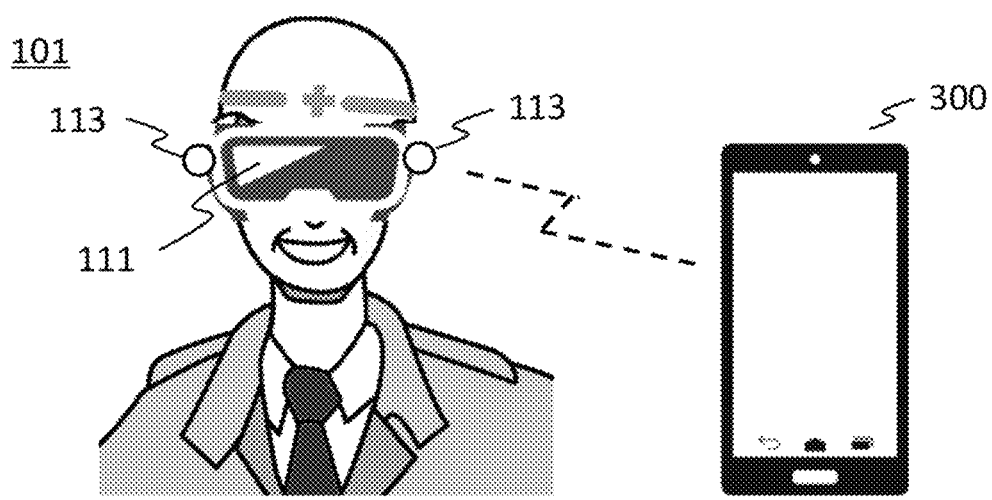
FIG. 10 is an external view illustrating a state in which a user wears the HMD and connects the HMD to the portable information terminal.

FIG. 10 is an external view illustrating a state in which a user wears the HMD 101 in FIG. 8 and connects the HMD 101 to the portable information terminal 300. The HMD 101 is worn on the user's head, and can view an external landscape in front of eyes through a transmission type display 111. In addition, an AR image is displayed on the display 111 in a manner of being superimposed. For example, the portable information terminal 300 is carried by a user and can perform near field communication with the HMD 101. In addition, an AR image created by the portable information terminal 300 can be received by the HMD 101, and can be displayed on the display 111.

Next, description will be given of a mode switching operation of the AR image in this example. In this example, the HMD 101 and the portable information terminal 300 are configured to generate the AR image in cooperation, and the mode switching operation is also performed by confirming counterpart situations, respectively.

Figure 11A:
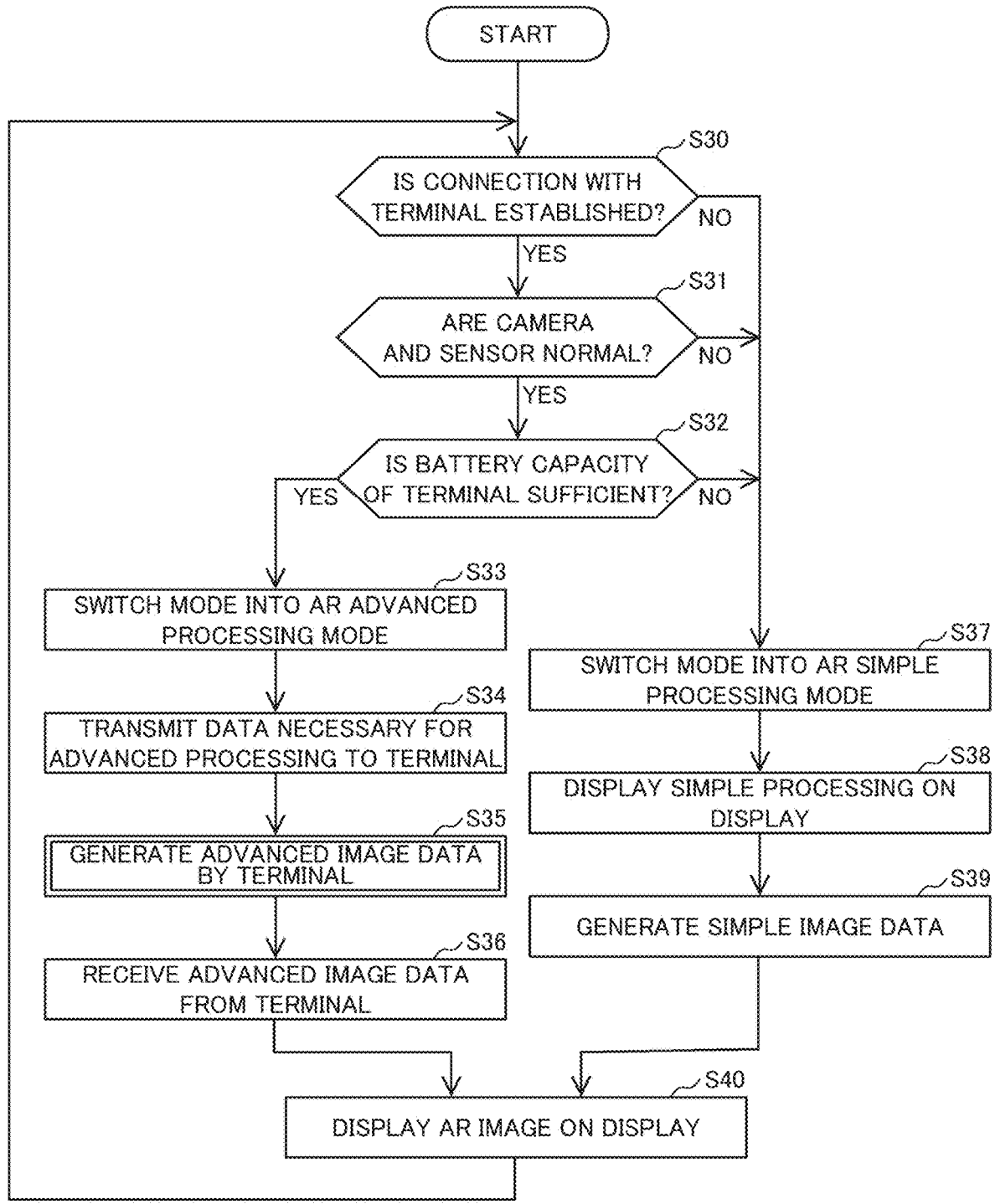
FIG. 11A is a flowchart illustrating a mode switching operation (HMD side).

FIG. 11A and FIG. 11B are flowcharts illustrating the mode switching operation in this example. An operation on the HMD 101 side is illustrated in FIG. 11A, and an operation on the portable information terminal 300 side is illustrated in FIG. 11B.

First, description will be given from the operation on the HMD 101 side with reference to FIG. 11A.

S30: The HMD 101 determines whether or not normal connection with the portable information terminal 300 is established. For example, connection is confirmed by checking electrical connection, or by using presence or absence of a data transmission error between apparatuses, mutual authentication process, or the like. When the connection can be confirmed (Yes), the process proceeds to S31, and when the connection cannot be confirmed (No), the process proceeds to S37.

S31: Determination is made as to whether or not the operation of the camera 113 and the sensor group 115 is normal. In a case of normality (Yes), the process proceeds to S32, and in a case of abnormality (No), the process proceeds to S37.

S32: Determination is made on the residual capacity (a detection result obtained by the battery capacity detector 318) of the battery 317 of the portable information terminal 300 through the near field communication interfaces 140 and 340. When the residual capacity is sufficient (Yes), the process proceeds to S33, and when the residual capacity is deficient (No), the process proceeds to S37. Note that, as other situations, in a case where the portable information terminal 300 is performing another processing already and cannot correspond to the AR advanced image processing, and the like, determination is made as No, and the process proceeds to S37.

S33: The mode switcher 120 switches a mode into an advanced processing mode of generating an AR advanced image by using the portable information terminal 300.

S34: Captured image data from the camera 113 of the HMD 101, and various pieces of sensor data from the sensor group 115 are transmitted to the portable information terminal 300 through the near field communication interface 140.

S35: The portable information terminal 300 generates AR advanced image data by using the data received from the HMD 101. Details of the processing will be described with reference to FIG. 11B.

S36: The AR advanced image data generated in the portable information terminal 300 is received through the near field communication interface 140.

S37: In a case where any determination among S30 to S32 is No, the cooperative operation relating to AR advanced display with the portable information terminal 300 is stopped, and the mode switcher 120 switches a mode into the simple processing mode performed by the AR simple processor 122. Processing of the simple processing mode is similar to S14 to S16 in Example 1 (FIG. 3).

S38: A gist indicating "AR simple processing" is displayed on the display 111, and a user is notified of the gist.

S39: AR simple image data (text data or the like) is generated in the AR simple processor 122.

S40: The AR advanced image data received from the portable information terminal 300 in S36, or the AR simple image data generated in the AR simple processor 122 in S39 are displayed on the display 111. Then, the process returns to S30, and the above-described processes are repeated, and the mode switching and the AR image display are performed.

Next, description will be given of the operation on the portable information terminal 300 side with reference to FIG. 11B.

S41: The portable information terminal 300 determines whether or not normal connection with the HMD 101 is established. For example, in a similar manner as in FIG. 11A (S30), presence or absence of a data transmission error between apparatuses or the like is checked. When the connection can be confirmed (Yes), the process proceeds to S42, and when the connection cannot be confirmed (No), the process proceeds to S46.

S46: Determination is made as abnormal connection, and the cooperative operation with the HMD 101 is stopped.

S42: The residual capacity of the battery 317 of the portable information terminal 300 is detected by the battery capacity detector 318, and determination is made as to whether or not the residual capacity is sufficient for executing the AR advanced processing. When the residual capacity is sufficient (Yes), the process proceeds to S43, and when the residual capacity is not sufficient (No), the process proceeds to S47.

S47: Information indicating that the battery residual capacity is deficient is transmitted to the HMD 101 through the near field communication interface 340. The information is used in determination in S32 in FIG. 11A.

S43: Data necessary for the AR advanced processing is received from the HMD 101 through the near field communication interface 340.

S44: The AR advanced processor 321 generates the AR advanced image data by using the received data. Generation of the AR advanced image data is performed in a similar manner as in Example 1 (S13 in FIG. 3). Therefore, the program (application) 326 and the information data 327 stored in the storage 325 are used.

S45: The generated AR advanced image data is transmitted to the HMD 101 through the near field communication interface 340. Then, the process returns to S41, and the above-described processes are repeated.

A display example of the AR images (an advanced image and a simple image) in this example is similar to FIG. 6A to FIG. 7B in Example 1.

In this example, since the HMD 101 and the portable information terminal 300 are configured to perform the AR advanced image processing in cooperation, it is necessary to prevent unauthorized access from unauthorized users or apparatuses. Here, important data such as an image captured by a camera and AR image data is transmitted or received after authenticating that users or apparatuses are authorized. Hereinafter, a user authentication operation will be described.

Figure 12A:
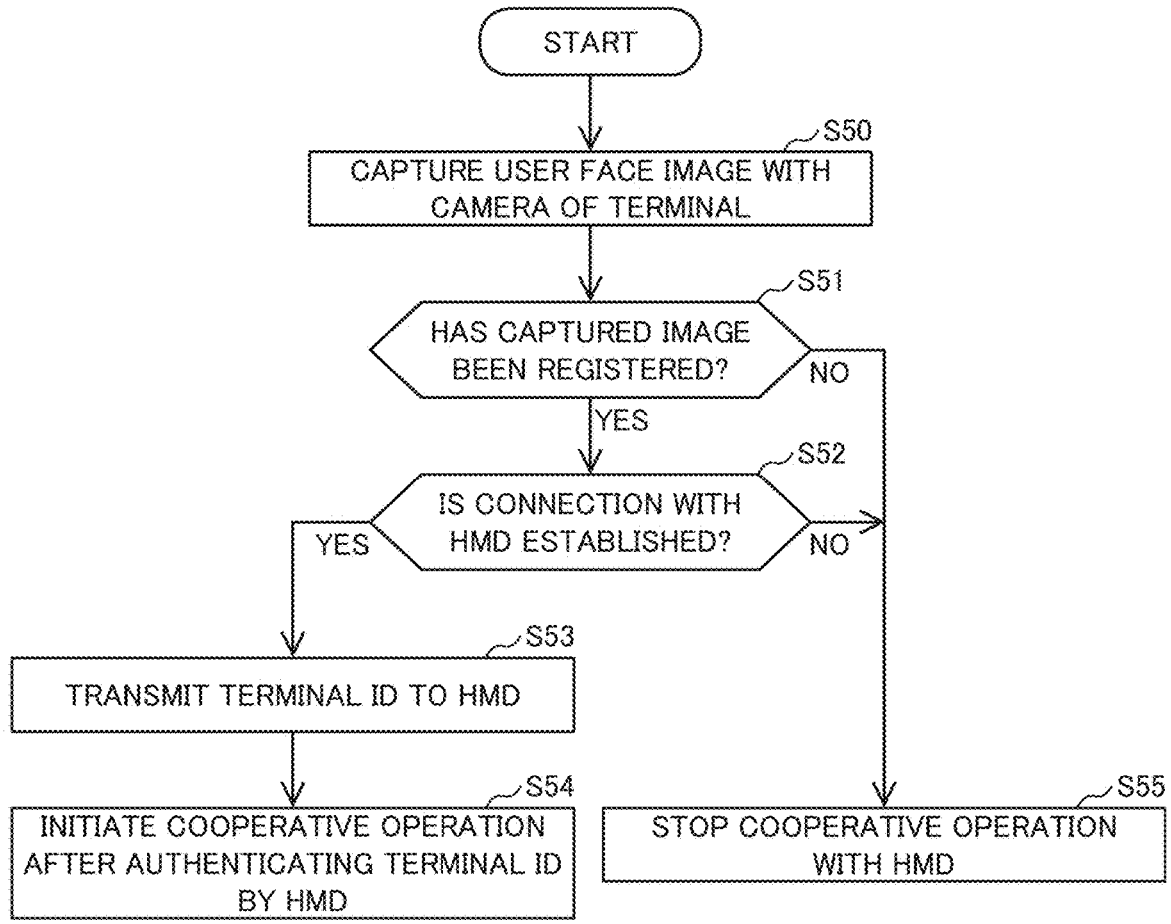
FIG. 12A is a flowchart illustrating a user authentication operation (portable information terminal side).

FIG. 12A and FIG. 12B are flowcharts illustrating the user authentication operation. FIG. 12A illustrates an authentication operation on the portable information terminal 300 side, and FIG. 12B illustrates an authentication operation on the HMD 101 side. Here, with regard to the user authentication method, description will be given with reference to authentication using a face image, but a method of using a fingerprint, a method of using a vein pattern, a method of using an iris image, and the like can also be used.

First, the operation on the portable information terminal 300 side will be described with reference to FIG. 12A.

S50: A face image of a user is captured by the camera 313 of the portable information terminal 300.

S51: The user authenticator 323 of the portable information terminal 300 determines whether or not the face image of the user is a face image registered in the user ID 328 of the portable information terminal 300. When the face image has been registered (Yes), the process proceeds to S52, and when the face image is not registered (No), the process proceeds to S55.

S52: The portable information terminal 300 determines whether or not normal connection with the HMD 101 is established in accordance with presence or absence of data transmission error between apparatuses, or the like. When connection can be confirmed (Yes), the process proceeds to S53, and when connection cannot be confirmed (No), the process proceeds to S55.

S53: The terminal ID 328 of the portable information terminal 300 is transmitted to the HMD 101 through the near field communication interface 340.

S54: When the HMD 101 can confirm that the portable information terminal 300 is a registered terminal, a cooperative operation between the portable information terminal 300 and the HMD 101 is initiated.

S55: The user cannot use the portable information terminal 300, and stops the cooperative operation with the HMD 101.

Next, the operation on the HMD 101 side will be described with reference to FIG. 12B.

S60: The HMD 101 determines whether or not normal connection with the portable information terminal 300 is established in accordance with presence or absence of data transmission error between apparatuses, or the like. When connection can be confirmed (Yes), the process proceeds to S61, and when connection cannot be confirmed (No), the process proceeds to S67.

S61: An iris image of the user is captured by the camera 113 of the HMD 101.

S62: The user authenticator 123 determines whether or not the captured iris image has been registered in the user ID 128 of the storage 125. When the iris image has been registered (Yes), the process proceeds to S63, and the iris image has not been registered (No), the process proceeds to S67.

S63: The terminal ID 328 is received from the portable information terminal 300 (corresponding to S53).

S64: It is determined that the received terminal ID 328 is a terminal that can be used by the user specified in S62. When the terminal ID 328 has been registered (Yes), the process proceeds to S65, and when the terminal ID 328 has not been registered (No), the process proceeds to S67.

S65: The cooperative operation with the portable information terminal 300 is initiated. That is, data necessary for generating the AR advanced image data is transmitted from the HMD 101 to the portable information terminal 300. As a result, the portable information terminal 300 generates the AR advanced image data, and the HMD 101 receives and displays the generated AR advanced image data.

S66: It is determined that the HMD 101 is continuously mounted on the user. When the HMD 101 is continuously mounted (Yes), the process returns to S65, and the cooperative operation with the portable information terminal 300 is continued. When the HMD 101 is not continuously mounted (No), since there is a possibility that a user has been changed, the process returns to S61 and performs the user authentication again.

S67: The cooperative operation of the HMD 101 is locked, and the cooperative operation with the portable information terminal 300 is stopped.

As described above, in Example 2, in a case where the HMD 101 and the portable information terminal 300 are connected to each other, a user and an apparatus ID (terminal ID) are mutually confirmed, and thus it is possible to prevent access from unauthorized users or apparatuses, and it is possible to construct an image display system in which data transmission with high reliability is performed between registered safe users and apparatuses. In addition, in authentication processing of the HMD 101 and the portable information terminal 300, it is also effective to exchange specifications of mutual apparatuses (terminals). For example, when exchanging information such as resolution and a display speed of a display image in the HMD 101, and a processing speed of the CPU and the battery residual capacity in the portable information terminal 300, optimal image processing becomes possible.

Note that, even in Example 2, the HMD 101 and the portable information terminal 300 are connected to the external server 200 through the network 150. Accordingly, the HMD 101 and the portable information terminal 300 can also generate the AR image data by using information stored in the external server 200 managed by a management company, or the AR image data generated in the external server 200 in a similar manner as in Example 1. Accordingly, the user authentication may be performed in a similar manner as in Example 1.

According to Example 2, the HMD 101 generates only the AR simple image data, and the AR advanced image data is generated in the portable information terminal 300, and thus the configuration of the HMD 101 is simplified, and an apparatus that is inexpensive and light can be provided.

Note that, the invention is not limited to the above-described examples, and includes various modification examples. For example, the examples are described in detail for easy comprehension of the invention, and it is not limited to include all configurations described above. In addition, a part of configuration of an arbitrary example can be substituted with a configuration of another example, and a configuration of another example may be added to a configuration of an arbitrary example. In addition, with respect to a part of configurations of the respective examples, addition, deletion, and substitution of another configuration can be made.

REFERENCE SIGNS LIST

20 AR advanced image
30 AR simple image
100, 101 Head-mounted display (HMD)
110, 310 Controller (CPU)
111, 311 Display
112 Image projector
113, 313 Camera
114 Camera abnormality detector
115, 315 Sensor group
116 Sensor abnormality detector
117, 317 Battery
118, 318 Battery capacity detector
120 Mode switcher
121, 321 AR advanced processor
122 AR simple processor
123, 323 User authenticator
124, 324 RAM
125, 325 Storage
126, 326 Program
127, 327 Information data
128, 328 Apparatus (terminal) ID/User ID
130, 330 Communication interface
140, 340 Near field communication interface
150 Network
200 External server
211 Information generator
212 Database
300 Portable information terminal
312 Display controller

The invention claimed is:

1. A head-mounted display comprising:
a camera imaging an external landscape;
a sensor detecting a position and a distance of an object within the external landscape, and a movement of the head-mounted display;
a display for displaying an image;
a near field communication interface for transmitting and receiving from a portable information terminal which is a different terminal from the head-mounted display; and
a controller switching a processing mode generating the image,
wherein the controller is configured to switch between a first augmented reality (AR) processing mode of generating a first AR image and a second AR processing mode of generating a second AR image in correspondence with a battery residual capacity of the portable information terminal which is received through the near field communication interface, wherein the first AR image is an augmented reality image generated by the head-mounted display, wherein the second AR image is an augmented reality image generated by the portable information terminal after transmitting image data captured by the camera and detection data detected by the sensor to the portable information terminal through the near field communication interface, wherein the display is configured to display the first AR image when the controller controls the processing mode for the first AR processing mode, and wherein the display is configured to display the second AR image when the controller controls the processing mode for the second AR processing mode.

2. The head-mounted display according to claim 1, wherein in a case where the battery residual capacity of the portable information terminal is equal to or greater than a predetermined value, the controller switches the processing mode into the second AR processing mode.

3. The head-mounted display according to claim 2, wherein in a case where the battery residual capacity of the portable information terminal is less than the predetermined value, the controller switches the processing mode into the first AR processing mode.

4. The head-mounted display according to claim 3, wherein in a case where the processing mode is switched into the first AR processing mode by the controller, a notification is displayed on the display indicating that first AR processing is displayed on the display.

5. The head-mounted display according to claim 1, wherein the first AR image is a text image that is displayed at a predetermined position of the display without using image data captured by the camera and detection data detected by the sensor.

6. The head-mounted display according to claim 1, wherein the second AR image is displayed at a position related to the object detected by the camera.

7. An image display system including a head-mounted display and a portable information terminal that are connected to each other, the image display system generating an image to be displayed through cooperation of the head-mounted display and the portable information terminal, wherein the head-mounted display includes,
a camera imaging an external landscape,
a sensor detecting a position and a distance of an object within the external landscape, and a movement of the head-mounted display,
a display for displaying an image,
a first near field communication interface for transmitting and receiving from the portable information terminal; and
a controller that switches a processing mode of generating the image to be displayed on the display, wherein the portable information terminal includes,
a battery supplying power, and
a second near field communication interface for transmitting and receiving from the head-mounted display, wherein the controller is configured to switch between a first augmented reality (AR) processing mode of generating first AR image and a second AR processing mode of generating a second AR image in correspondence with a battery residual capacity of the portable information terminal which is received through the first near field communication interface, wherein the first AR image is an augmented reality image generated by the head-mounted display, wherein the second AR image is an augmented reality image generated by the portable information terminal after transmitting image data captured by the camera and detection data detected by the sensor to the portable information terminal through the first near field communication interface, wherein the display is configured to display the first AR image when the controller controls the processing mode for the first AR processing mode, and wherein the display is configured to display the second AR image when the controller controls the processing mode for the second AR processing mode.

8. The image display system according to claim 7, wherein in a case where the battery residual capacity of the portable information terminal is equal to or greater than a predetermined value, the controller switches the processing mode into the second AR processing mode.

9. The image display system according to claim 8, wherein in a case where the battery residual capacity of the portable information terminal is less than the predetermined value, the controller switches the processing mode into the first AR processing mode.

10. The image display system according to claim 9, wherein in a case where the processing mode is switched into the first AR processing mode by the controller, a notification is displayed on the display indicating that first AR processing is displayed on the display.

11. The image display system according to claim 7, wherein the first AR image is a text image that is displayed at a predetermined position of the display without using image data captured by the camera and detection data detected by the sensor.

12. The image display system according to claim 7, wherein the second AR image is displayed at a position related to the object detected by the camera.

13. An image display method of displaying an image by a head-mounted display,
wherein the head-mounted display includes,
a display for displaying the image,
a camera imaging an external landscape,
a sensor detecting a position and a distance of an object within the external landscape, and a movement of the head-mounted display, and
a near field communication interface for transmitting and receiving from a portable information terminal which is a different terminal from the head-mounted display the method comprising:
based on a battery residual capacity of the portable information terminal, switching a processing mode of generating an image to be displayed between a first augmented reality (AR) processing mode of generating a first AR image and a second AR processing mode of generating a second AR image, wherein the first AR image is an augmented reality image generated by the head-mounted display, wherein the second AR image is an augmented reality image generated by the portable information terminal after transmitting image data captured by the camera and detection data detected by the sensor to the portable information terminal through the near field communication interface, generating the first AR image by the first AR processing mode, displaying the first AR image on the display based on controlling the processing mode for the first AR processing mode, and displaying the second AR on the display based on controlling the processing mode for the second AR processing mode.

\* \* \* \* \*